(12) United States Patent
Seo et al.

(10) Patent No.: US 7,410,266 B2
(45) Date of Patent: *Aug. 12, 2008

(54) THREE-DIMENSIONAL IMAGING SYSTEM FOR ROBOT VISION

(75) Inventors: Cheong Soo Seo, Seongnam (KR); Sang Hyune Baek, Suwon (KR); Gyoung Il Cho, Seoul (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 334 days.

This patent is subject to a terminal disclaimer.

(21) Appl. No.: 11/319,987

(22) Filed: Dec. 28, 2005

(65) Prior Publication Data

US 2007/0188883 A1 Aug. 16, 2007

Related U.S. Application Data

(63) Continuation-in-part of application No. 10/806,299, filed on Mar. 22, 2004, now Pat. No. 7,057,826, which is a continuation-in-part of application No. 10/822,414, filed on Apr. 12, 2004, now Pat. No. 7,068,416, which is a continuation-in-part of application No. 10/872,241, filed on Jun. 18, 2004, now Pat. No. 7,382,516, which is a continuation-in-part of application No. 10/893,039, filed on Jul. 16, 2004, now Pat. No. 7,239,438, which is a continuation-in-part of application No. 10/979,619, filed on Nov. 2, 2004, which is a continuation-in-part of application No. 10/979,624, filed on Nov. 2, 2004, now Pat. No. 7,261,417, which is a continuation-in-part of application No. 10/983,353, filed on Nov. 8, 2004, now Pat. No. 7,267,447.

(51) Int. Cl.
*G02B 5/08* (2006.01)
*G06T 17/00* (2006.01)

(52) U.S. Cl. .................. 359/851; 382/153; 348/113; 348/135

(58) Field of Classification Search ......... 348/113–120, 348/135; 382/153; 359/676, 850, 851, 855
See application file for complete search history.

(56) References Cited

U.S. PATENT DOCUMENTS

| 2,002,376 | A | 5/1935 | Mannheimer |
| 4,407,567 | A | 10/1983 | Michelet |
| 4,834,512 | A | 5/1989 | Austin |
| 5,004,319 | A | 4/1991 | Smither |
| 5,103,306 | A | 4/1992 | Weiman et al. |
| 5,109,425 | A | 4/1992 | Lawton |
| 5,212,555 | A | 5/1993 | Stoltz |
| 5,369,433 | A | 11/1994 | Baldwin |
| 5,402,407 | A | 3/1995 | Eguchi |

(Continued)

*Primary Examiner*—Darryl J Collins (57) ABSTRACT

The present invention provides a three-dimensional imaging system for robot vision, which is capable of three-dimensional positioning of objects, object identification, searching and tracking of an object of interest, and compensating the aberration of the system. The three-dimensional imaging system for robot vision comprises one or more camera systems, each of which has at least one variable focal length micromirror array lens, an imaging unit, and an image processing unit. The variable focal length micromirror array lens used in the three-dimensional imaging system for robot vision has unique features including a variable focal length, a variable focal axis, and a variable field of view with a fast response time.

19 Claims, 5 Drawing Sheets

U.S. PATENT DOCUMENTS

| | | | |
|---|---|---|---|
| 5,432,712 A | 7/1995 | Chan | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,272,002 B1 | 8/2001 | Lee | |
| 6,282,213 B1 | 8/2001 | Gutin et al. | |
| 6,315,423 B1 | 11/2001 | Yu | |
| 6,329,737 B1 | 12/2001 | Jerman | |
| 6,498,673 B1 | 12/2002 | Frigo | |
| 6,507,366 B1 | 1/2003 | Lee | |
| 6,549,730 B1 | 4/2003 | Hamada | |
| 6,625,342 B2 | 9/2003 | Staple | |
| 6,649,852 B2 | 11/2003 | Chason | |
| 6,650,461 B2 | 11/2003 | Atobe | |
| 6,658,208 B2 | 12/2003 | Watanabe | |
| 6,711,319 B2 | 3/2004 | Hoen | |
| 6,741,384 B1 | 5/2004 | Martin | |
| 6,784,771 B1 | 8/2004 | Fan | |
| 6,833,938 B2 | 12/2004 | Nishioka | |
| 6,885,819 B2 | 4/2005 | Shinohara | |
| 6,900,901 B2 | 5/2005 | Harada | |
| 6,900,922 B2 | 5/2005 | Aubuchon | |
| 6,906,848 B2 | 6/2005 | Aubuchon | |
| 6,906,849 B1 | 6/2005 | Mi | |
| 6,914,712 B2 | 7/2005 | Kurosawa | |
| 6,919,982 B2 | 7/2005 | Nimura | |
| 6,934,072 B1 | 8/2005 | Kim | |
| 6,934,073 B1 | 8/2005 | Kim | |
| 6,958,777 B1 | 10/2005 | Pine | |
| 6,970,284 B1 | 11/2005 | Kim | |
| 6,995,909 B1 | 2/2006 | Hayashi | |
| 6,999,226 B2 | 2/2006 | Kim | |
| 7,023,466 B2 | 4/2006 | Favalora | |
| 7,031,046 B2 | 4/2006 | Kim | |
| 7,046,447 B2 | 5/2006 | Raber | |
| 7,068,416 B2 | 6/2006 | Gim | |
| 7,077,523 B2 | 7/2006 | Seo | |
| 7,161,729 B2 | 1/2007 | Kim | |
| 7,212,330 B2 * | 5/2007 | Seo et al. | 359/298 |
| 7,261,417 B2 * | 8/2007 | Cho et al. | 353/10 |
| 2002/0018407 A1 | 2/2002 | Komoto | |
| 2002/0102102 A1 | 8/2002 | Watanabe | |
| 2002/0135673 A1 | 9/2002 | Favalora | |
| 2003/0058520 A1 | 3/2003 | Yu | |
| 2003/0071125 A1 | 4/2003 | Yoo | |
| 2003/0174234 A1 | 9/2003 | Kondo | |
| 2003/0184843 A1 | 10/2003 | Moon | |
| 2004/0009683 A1 | 1/2004 | Hiraoka | |
| 2004/0012460 A1 | 1/2004 | Cho | |
| 2004/0021802 A1 | 2/2004 | Yoshino | |
| 2004/0052180 A1 | 3/2004 | Hong | |
| 2004/0246362 A1 | 12/2004 | Konno | |
| 2004/0252958 A1 | 12/2004 | Abu-Ageel | |
| 2005/0024736 A1 | 2/2005 | Bakin | |
| 2005/0057812 A1 | 3/2005 | Raber | |
| 2005/0136663 A1 | 6/2005 | Gan | |
| 2005/0174625 A1 | 8/2005 | Huiber | |
| 2005/0180019 A1 | 8/2005 | Cho | |
| 2005/0212856 A1 | 9/2005 | Temple | |
| 2005/0224695 A1 | 10/2005 | Mushika | |
| 2005/0225884 A1 | 10/2005 | Gim | |
| 2005/0231792 A1 | 10/2005 | Alain | |
| 2005/0264870 A1 | 12/2005 | Kim | |
| 2006/0012766 A1 | 1/2006 | Klosner | |
| 2006/0012852 A1 | 1/2006 | Cho | |
| 2006/0028709 A1 | 2/2006 | Cho | |
| 2006/0187524 A1 | 8/2006 | Sandstrom | |
| 2006/0209439 A1 * | 9/2006 | Cho et al. | 359/851 |

* cited by examiner

THREE-DIMENSIONAL IMAGING SYSTEM FOR ROBOT VISION

REFERENCES TO RELATED APPLICATIONS

This application is a continuation-in-part of, and claims priority to U.S. patent application Ser. No. 10/806,299 filed Mar. 22, 2004, U.S. patent application Ser. No. 10/822,414 filed Apr. 12, 2004, U.S. patent application Ser. No. 10/983,353 filed Nov. 8, 2004, U.S. patent application Ser. No. 10/872,241 filed Jun. 18, 2004, U.S. patent application Ser. No. 10/893,039 filed Jul. 16, 2004, U.S. patent application Ser. No. 10/979,619 filed Nov. 2, 2004, and U.S. patent application Ser. No. 10/979,624 filed Nov. 2, 2004, all of which are hereby incorporated by reference.

FIELD OF INVENTION

The present invention relates to a three-dimensional imaging system for robot vision comprising at least one micromirror array lens.

BACKGROUND OF INVENTION

Robots have been widely used in the industry to replace human who had to perform dangerous and repetitive tasks. While earlier robots are usually required to manipulate objects in a limited range with less or no flexibility like robot arms in assembly lines, recent robots have become more intelligent and perceptive. Such robots are capable of performing more complex and difficult tasks including navigation, inspection, self-learning, and self-calibration thanks to advanced technologies for computation resources and sensory systems with lower cost. Some applications of these advanced robots include, but not limited to, housekeeping, underwater/space exploration, surgery with precision, and mine finding and mining.

Many aspects of sensory systems being used in robotics are adopted from human biological systems. Human senses including sight, hearing, smell, touch, and taste are very acute and efficient considering small sizes and fast processing times of their sensory systems. In the early stages of adopting these human sensing procedures, it was very difficult to create corresponding artificial sensory systems because of complexity, limited resources, and a lack of knowledge. Since then, a lot of efforts have been put into researches for these areas, and huge progresses have been made. Especially, human vision systems are relatively well understood and adopted in most advanced robot systems as a primary sensory system.

Some important features of human vision include three-dimensional perception, continuous tracking of a moving object, rapid object identification, and the like. Among them, three-dimensional perception is a fundamental element since it allows other features available. Many advanced robot systems that are required to perform navigation and/or manipulation in known or unknown environments have adopted three-dimensional vision systems, which collect and process environmental information surrounding a robot, and let the robot properly respond to stimuli without interruption from outside sources.

Typically, three-dimensional vision for robots can be accomplished by using stereo vision or optical flow methods, in which two images are compared in order to determine the three-dimensional location of an object. The former uses images taken by two parallel cameras that are disposed to view the object from different angles at the same time as disclosed in U.S. Pat. No. 5,432,712 to Chan, while the latter uses images taken at two different times by a single camera as disclosed in U.S. Pat. No. 5,109,425 to Lawton. Both methods require to find corresponding points of two different images using certain criteria such as color, shape, contrast, or other representative features. However, these processes can be very erroneous and time-consuming.

Research suggests that the human vision system is more efficient and effective in that it is capable of a rapid eye movement to the point of interest and contrasting high central visual resolution with low peripheral visual resolution in a wide field of view as disclosed in U.S. Pat. No. 5,103,306 to Weiman et al. These aspects demand fast changes of the optical axis and field of view of a lens system. However, it is difficult to accomplish such efficiency and effectiveness in a conventional robot vision system since those changes are usually performed by a complicated macroscopic servo mechanism.

To overcome the drawbacks of existing technologies, a desirable robot vision system requires a high-speed, accurate, miniaturized, and inexpensive three-dimensional imaging system.

SUMMARY OF INVENTION

The present invention provides a three-dimensional imaging system for robot vision, which is capable of three-dimensional positioning of an object, object identification, searching and tracking the object, and compensation for the aberration of the system.

One aspect of the invention is to provide a three-dimensional imaging system for robot vision that generates an all-in-focus image and three-dimensional position information of an object.

The three-dimensional imaging system for robot vision comprises at least one camera system having a lens system including at least one variable focal length micromirror array lens (MMAL), an imaging unit, and an image processing unit.

The variable focal length MMAL comprises a plurality of micromirrors. The following US patents and applications describe the MMAL: U.S. Pat. No. 6,934,072 to Kim, U.S. Pat. No. 6,934,073 to Kim, U.S. patent application Ser. No. 10/855,554 filed May 27, 2004, U.S. patent application Ser. No. 10/855,715 filed May 27, 2004, U.S. patent application Ser. No. 10/857,714 filed May 28, 2004, U.S. patent application Ser. No. 10/857,280 filed May 28, 2004, U.S. patent application Ser. No. 10/893,039 filed May 28, 2004, and U.S. patent application Ser. No. 10/983,353 filed Mar. 4, 2005, all of which are hereby incorporated by reference.

The variable focal length MMAL is suitable for the three-dimensional imaging system of the present invention since it has a fast focusing speed and a large range of focal length, and since it can be made to have either a small or a large aperture just adding more micromirrors to cover the aperture area.

The imaging unit includes one or more two-dimensional image sensors taking two-dimensional images at different focal planes. The detail for three-dimensional imaging using the variable focal length MMAL can be found in U.S. patent application Ser. No. 10/822,414 filed Apr. 12, 2004, U.S. patent application Ser. No. 10/979,624 filed Nov. 2, 2004, and U.S. patent application Ser. No. 11/208,115 filed Aug. 19, 2005.

The image sensor takes two-dimensional images of an object or scene with one or more focal planes that are shifted by changing the focal length of the variable focal length MMAL. The image processing unit extracts substantially in-focus pixels or areas from each two-dimensional image to generate a corresponding in-focus depthwise image. Each in-focus depthwise image represents a portion of the object or scene having the same image depth. Based on the known focal length of the two-dimensional image, the known distance from the lens to the image plane, and the magnification of the lens, three-dimensional position information of a portion of the object corresponding to each pixel of the in-focus depthwise image can be obtained. The focal length of the variable focal length MMAL can progressively increase or decrease, or vary in a selected order within a focal length variation range of the variable focal length MMAL such that any portion of the object or scene is imaged substantially in-focus at least once. A set of in-focus depthwise images taken at different focal lengths with a fast imaging rate represents the object or scene at a given moment. The object can remain still or be moving. For the case that the object is moving, the movement of the object can be ignored when the imaging rate is fast enough. The number of in-focus depthwise images representing the object at a given moment (number of depths) depends on the depth resolution requirement and the focusing speed of the variable focal length MMAL, and may increase for a better image quality. There are several methods for the image processing unit to generate an all-in-focus image of the object or scene from in-focus depthwise images thereof. Recent advances in both the image sensor and the image processing unit make them as fast as they are required to be. Three-dimensional position information of a portion of the object corresponding to each pixel of the all-in-focus image is obtained in the same way as in the in-focus depthwise image case. All the processes to obtain an all-in-focus image and three-dimensional position information of the object are achieved within a unit time which is at least persistent rate of the human eye.

Three-dimensional position information of an object or scene is a necessary element for robot's object manipulation and navigation. Also, the all-in-focus image and three-dimensional position information of the object enables the object identification to be more accurate and robust since three-dimensional object identification is less subject to the object orientation, illumination, and other environmental factors. The detail for the three-dimensional imaging system for pattern recognition using the variable focal length MMAL can be found in U.S. patent application Ser. No. (11/294,944) filed Dec. 6, 2005.

The next aspect of the invention is to provide an optical tracking unit using a three-dimensional imaging system for robot vision that performs searching and tracking an object of interest. Similar to the aforementioned human vision system, it is desirable that the object is searched in a wide field of view with low resolution images while being identified and tracked in a narrow field of view with higher resolution images. The variable focal length MMAL of the present invention has a large range of focal length variation, which can offer a variable field of view (a variable magnification); a wider field of view with a large magnification and a narrow field of view with a small magnification. The field of view is changed without macroscopic movements of the lens system because each micromirror of the variable focal length MMAL is adjusted for varying the focal length and actuated by the electrostatic force and/or electromagnetic force.

Tracking systems usually require that the object of interest be in the center of an image sensor. However, this entails a camera attitude control or a robot body attitude control for large-scale tracking. In the optical tracking unit of the present invention, the optical axis of the variable focal length MMAL can be adjusted in a limited range by controlling each micromirror of the variable focal length MMAL independently without using macroscopic servo mechanisms, which allows the robot vision system to be simplified and lightly weighted when compared to that having conventional tracking systems. The focusing speed of the variable focal length MMAL is so fast that a moving object can be identified and tracked. The principles of maintaining focus on a fast moving object are described in detail in U.S. patent Ser. No. 10/896,146 filed Jul. 21, 2005.

Another aspect of the invention is to provide a three-dimensional imaging system for robot vision that can compensate the aberration by controlling each micromirror independently. The present three-dimensional imaging system can produce a substantially sharp image through entire area without blurring or vignetting.

Still another aspect of the invention is to provide a small and compact three-dimensional imaging system for robot vision which can be used in a micro-robot vision system having limitation in space. Unlike conventional stereo vision systems that require at least two camera systems, the present invention can determine three-dimensional position information of an object or scene using only a single camera system, and this renders a simpler camera calibration and a more compact imaging device. Further, since the variable focal length MMAL can be made to have a small aperture, and the magnification and optical axis can be adjusted without macroscopic movements of the lens system, the three-dimensional imaging system for robot vision of the present invention can be made small and compact.

The present invention of the three-dimensional imaging system for robot vision using the variable focal length MMAL has the following advantages: (1) the system provides all-in-focus images; (2) the system provides three-dimensional position information of an object or scene using a single camera system; (3) The imaging processes to obtain an all-in-focus image and three-dimensional position information of an object or scene is achieved faster than the persistent rate of the human eye; (4) the system has a large variation of field of view since the system has a large range of focal depth; (5) the system uses a large field of view for searching and a small field of view for identifying or tracking an object of interest; (6) the system has a variable optical axis to locate an object image in the center of an image sensor; (7) the system can identify and track a moving object; (8) the system has a high depth resolution; (9) the production cost of the system is inexpensive because the variable focal length MMAL is inexpensive; (10) the system is very simple because there is no macroscopic mechanical displacement or deformation of the lens system; (11) the system is compact and suitable for the small as well as large robot vision system; (12) the system demands low power consumption when the variable focal length MMAL is actuated by electrostatic force.

Although the present invention is briefly summarized herein, the full understanding of the invention can be obtained by the following drawings, detailed description, and appended claims.

DETAILED DESCRIPTION OF THE ILLUSTRATED EMBODIMENTS

Figure 1:
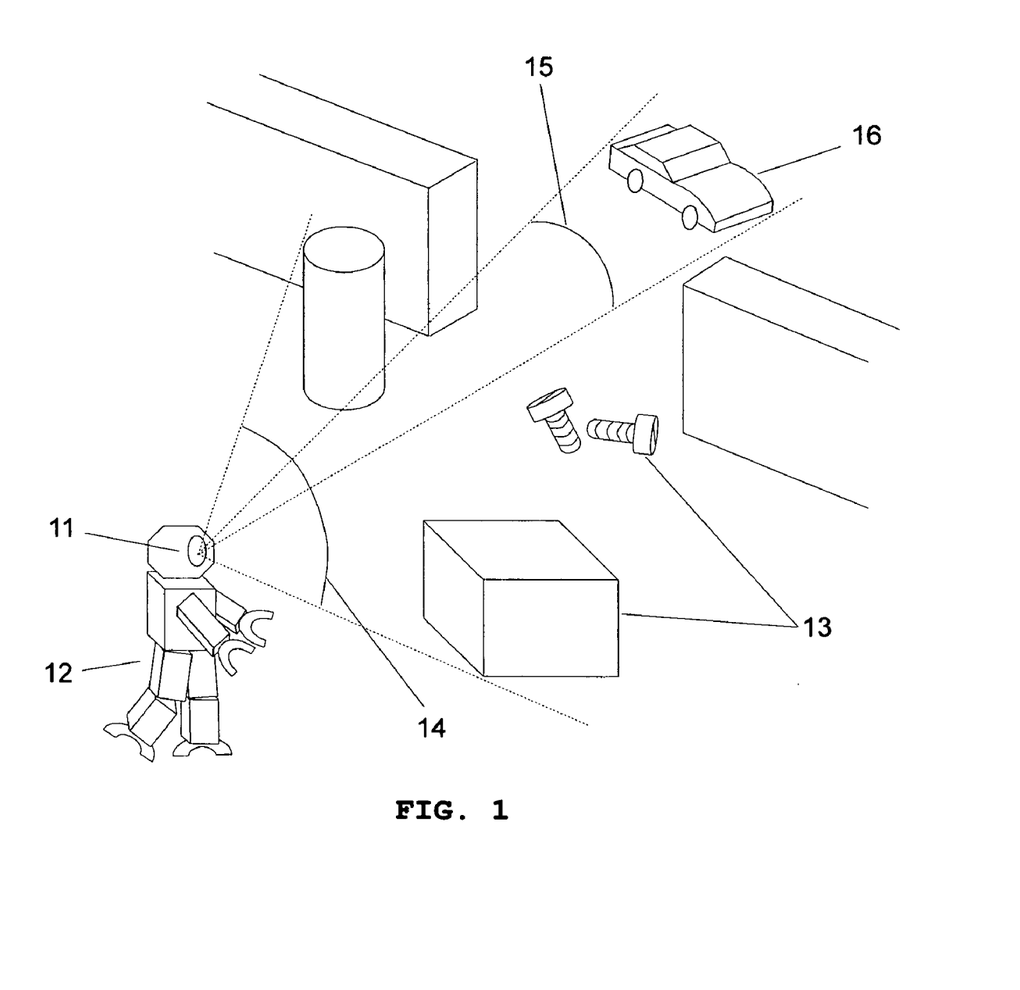
FIG. 1 is a schematic illustration of a three-dimensional imaging system for robot vision.

FIG. 1 illustrates a robot vision system 11 of a robot 12 working in various environments with different tasks including manipulation, object identification, searching and tracking an object of interest, and navigation in known and unknown territories. The image sensor (not shown) receives two-dimensional images with different focal planes that are shifted by changing the focal length of the variable focal length MMAL. The image processing unit (not shown) generates all-in-focus images and calculates three-dimensional position data of objects 13. Using all-in-focus images and three-dimensional position information of the object, the robot vision system can perform manipulation, object identification, searching and tracking a still or a moving object, navigation, and the like. It is efficient that the imaging system uses a wide field of view 14 to search an object of interest from the scene and then use a narrow field of view 15 to identify and track the object precisely. When using the narrow field of view, the object being tracked may be lost more easily (increase in dropout rate). Because the focal length of the MMAL can be quickly changed, a time-sharing technique can be utilized in order to use a narrow field of view for high resolution images and a wide field of view for low tracking dropout. It is also possible to adjust the optical axis of the MMAL to keep a moving object 16 in the center of the image sensor for a limited range without using macroscopic servo mechanisms.

Figure 2:
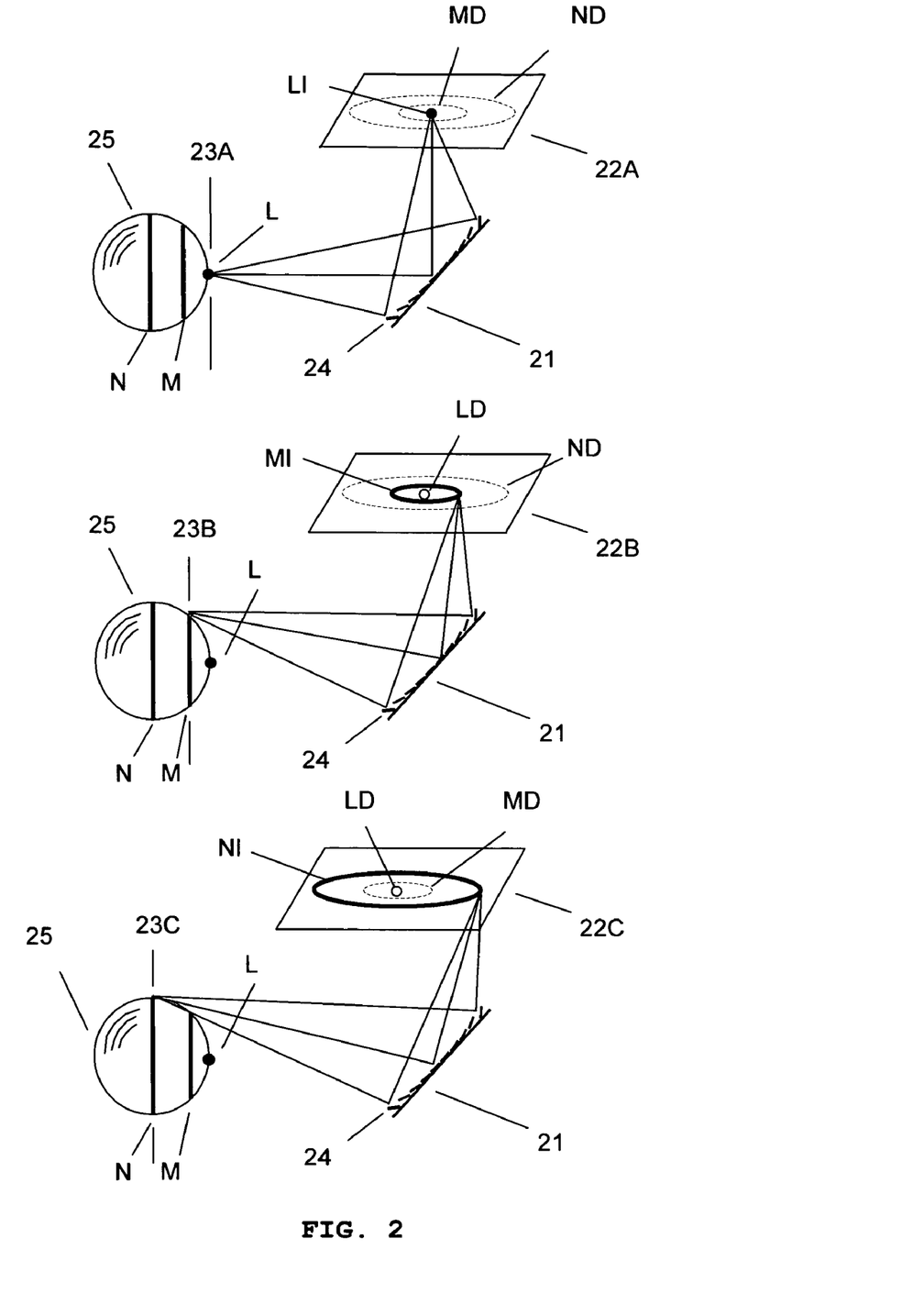
FIG. 2 is a schematic diagram showing how in-focus depthwise images are obtained from two-dimensional images with different focal planes.

FIG. 2 shows how a MMAL 21 takes two-dimensional images 22A, 22B, 22C with the focal planes 23A, 23B, 23C. The MMAL 21 comprises a plurality of micromirrors 24. Each micromirror 24 is controlled to change the focal length of the variable focal length MMAL 21. The focal length of the variable focal length MMAL 21 is changed by rotation and translation of each micromirror 24, which are controlled by electrostatic and/or electromagnetic force. Two-dimensional images 22A, 22B, 22C are taken with the depth information which corresponds to the position of the focal plane. The two-dimensional image 22A has in-focus image LI at the focal plane 23A, which is the image of a portion L of an object 25. Images MD, ND of portions M, N of an object 25 are defocused. The image processing unit determines the in-focus pixels LI from the two-dimensional images 22A. The two-dimensional image 22A with depth information gives in-focus pixels LI corresponding to the focal plane 23A. The two-dimensional images 22B, 22C with the second and third focal plane 23B, 23C are processed in the same manner as the first focal plane 23A to get in-focus images with depth information. Also the imaging system can perform the automatic focusing function for finding the object distance by changing the focal plane of the MMAL.

Figure 3:
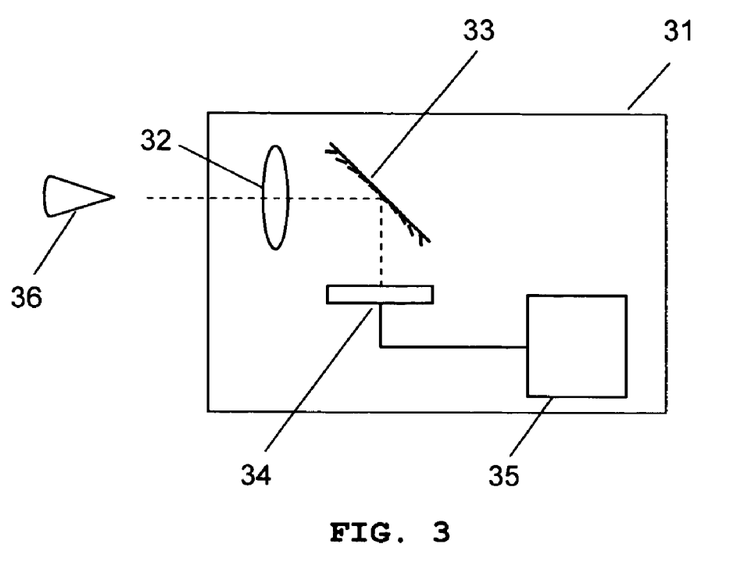
FIG. 3 is a schematic illustration of a three-dimensional imaging system for robot vision with a variable optical axis.

FIG. 3 schematically illustrates a three-dimensional imaging system for robot vision with a variable optical axis according to the one embodiment of the present invention. The three-dimensional imaging system for robot vision 31 comprises a lens system (32, 33), an imaging unit 34, and an image processing unit 35. The lens system includes an objective lens 32, and a variable focal length MMAL 33, optically coupled to the objective lens 32, configured to change the focal plane by changing the focal length of the MMAL 33. The imaging unit 34 receives two-dimensional images of an object 36 with different focal planes that are shifted by changing the focal length of the variable focal length MMAL 33. The image depth of the focal plane is obtained from the focal length of the variable focal length MMAL 33. The image processing unit 35 extracts substantially in-focus pixels or areas from original two-dimensional images taken at different focal planes to generate in-focus depthwise images and provides three-dimensional position information of the object 36. A set of in-focus depthwise images taken at different focal lengths with a fast imaging rate represents the object at a given moment. Then, the image processing unit 35 generates an all-in-focus image and three-dimensional position information of the object. By controlling individual micromirrors of the variable focal length MMAL 33, the optical axis can be adjusted, as will be explained in FIG. 5. Since the focal plane and the optical axis of the MMAL can be changed without macroscopic movements, the arrangement of optical elements in FIG. 3 requires a small space and allows a compact size three-dimensional imaging system for robot vision.

Figure 4:
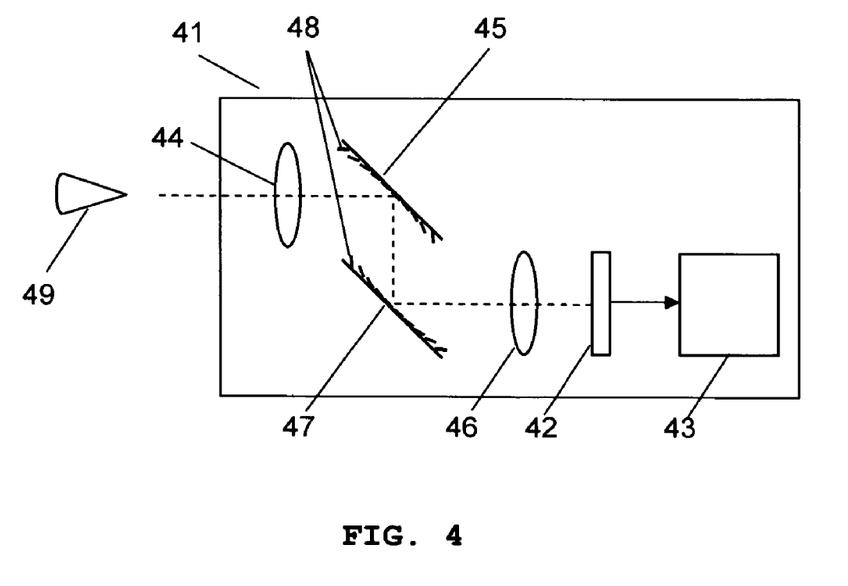
FIG. 4 is a schematic illustration of a three-dimensional imaging system for robot vision with a variable optical axis and a variable field of view.

FIG. 4 illustrates a three-dimensional imaging system for robot vision with a variable optical axis and a variable field of view (a variable magnification) according to the other embodiment of the present invention. The three-dimensional imaging system for robot vision 41 comprises a lens system, an imaging unit 42, and an image processing unit 43. The lens system comprises an objective lens 44, and a variable focal length MMAL 45, optically coupled to the objective lens 44, configured to change the focal plane by changing the focal length of the MMAL 45. The lens system also comprises an auxiliary lens 46 or group of lenses to change the field of view and image resolution. Further, the lens system comprises one or more auxiliary lenses for increasing the numerical aperture of the imaging system.

The lens system can comprise the second variable focal length MMAL 47 for a variable magnification. The first and second variable focal length MMAL 45, 47 are optically coupled and controlled to change the magnification of the system wherein the image of an object is optically magnified and to change the focal plane to form two-dimensional images in-focus at a given magnification. The objective lens 44 and the auxiliary lens 46 provide additional magnification. The field of view is adjusted without macroscopic movements of the lens system or time delay since each micromirror 48 of the variable focal length MMALs 45 and 47 is adjusted and actuated by electrostatic and/or electromagnetic force.

The image processing unit 43 generates an all-in-focus image and three-dimensional position information of an object 49 using two-dimensional images received from the imaging unit 42. The variable focal length MMAL 45 and 47 change their focal lengths so fast that the imaging processes to obtain the all-in-focus image and three-dimensional position formation of the object are achieved faster than the persistence rate of the human eye. Further, by controlling individual micromirrors of variable focal length MMALs, the optical axis of the lens system can be adjusted, as will be explained in FIG. 5. Since the MMAL can be made to have a small aperture, and the field of view and optical axis can be adjusted without macroscopic movements of the lens system, the arrangement of optical elements in FIG. 4 requires a small space and allows a compact size three-dimensional imaging system for robot vision.

Figure 5A:
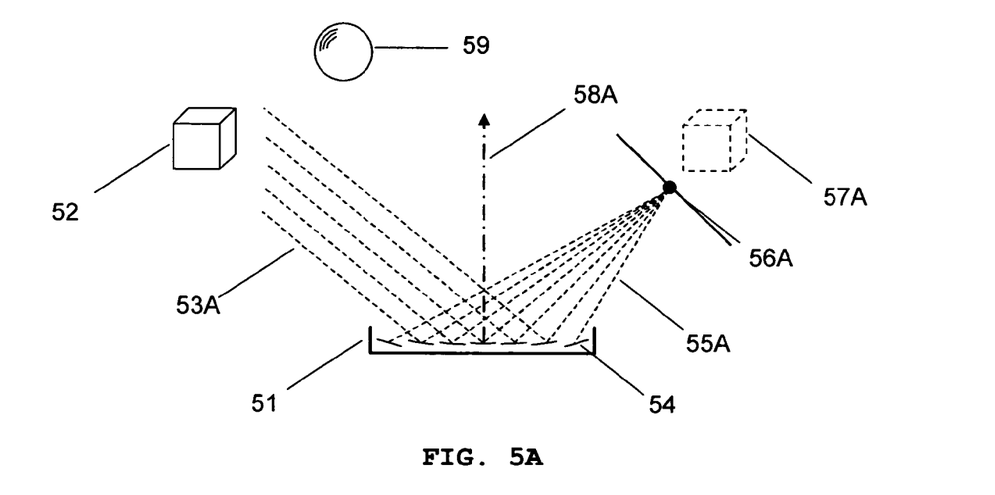
FIG. 5 is a schematic representation for optical axis changes in the MMAL.

The FIG. 5 shows how the optical axis of the MMAL changes. A bunch of light is focused by the MMAL 51. In FIG. 5A, a cube object 52 is imaged onto the image plane. The light 53A from the object 52 is reflected by each of the micromirror 54. The reflected light 55A is focused onto the focal plane 56A of the image and finally makes an image of a cube 57A in the image sensor. During the focusing process the optical axis is defined as a surface normal direction 58A of MMAL 51.

Figure 5B:
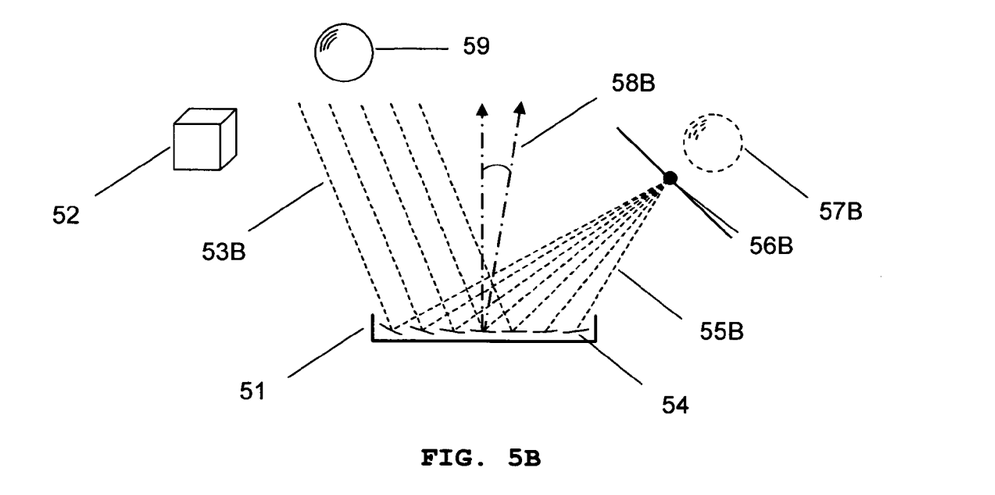

As shown in FIG. 5B, the MMAL can make a different image 57B from a different object 59 without macroscopic movements. By changing the respective angles of the micromirrors 54, the MMAL focuses the light 53B from the sphere 59 onto the image focal plane 56B. The reflected light 55B is focused onto a focal plane 56B and makes the image of the sphere 57B. This time the optical axis is changed by an angle and becomes the surface normal direction 58B of a micromirror.

Figures 6A, 6B:
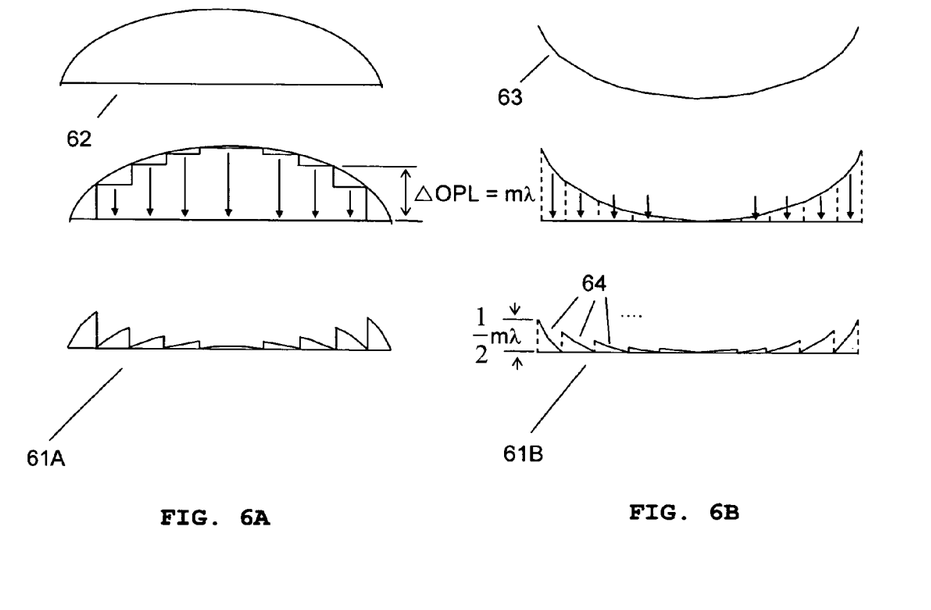
FIG. 6A is a schematic diagram showing how a refractive Fresnel lens replaces an ordinary single-bodied lens.
FIG. 6B is a schematic diagram showing how a reflective MMAL replaces an ordinary single-bodied mirror.

FIG. 6A schematically shows how a refractive Fresnel lens 61A replaces an ordinary single-bodied lens 62. FIG. 6B shows how a MMAL 61B replaces, replacing an ordinary single-bodied mirror 63. The MMAL includes a plurality of micromirrors 64, and each micromirror 64 is controlled to form a MMAL 61B and to change the focal length of the lens.

In order to obtain a bright and sharp image, the variable focal length MMAL must meet the two conditions for forming a lens. One is that all the rays should be converged into the focus, and the other is that the phase of the converged rays must be the same. Even though the rays have different optical path lengths, the same phase condition can be satisfied by adjusting the optical path length difference to be integer multiples of the wavelength of the light. Each facet converges rays to one point, and rays refracted or reflected by different facets have an optical path length difference of integer multiples of the incident light.

To change the focal length of the MMAL, the translational motion and/or the rotational motion of each of the micromirrors are controlled to change the direction of light and to satisfy the phase condition of the light.

The variable focal length MMAL is also an adaptive optical component compensating the aberration of the imaging system by controlling the translational motion and/or the rotational motion of each micromirror.

Figure 7A:
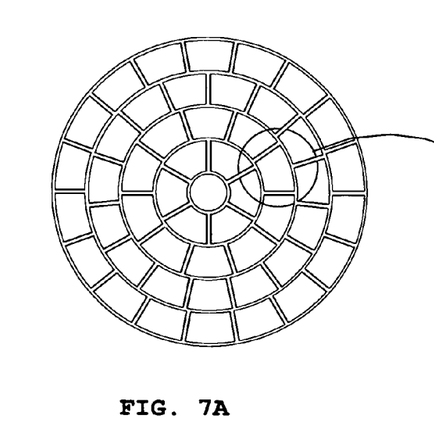
FIG. 7A is a schematic plan view showing a variable focal length MMAL that is made of many micromirrors.
Figure 7B:
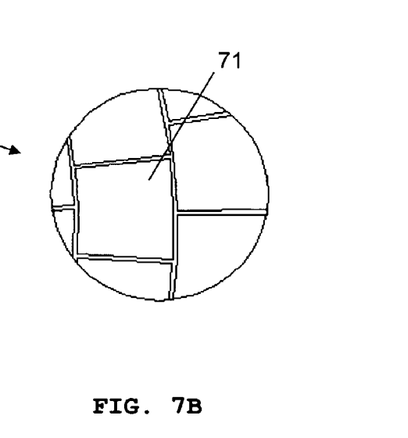
FIG. 7B is an enlarged detail plan view of the micromirrors.

FIGS. 7A and 7B show that the micromirrors 71 are arranged to form many concentric circles. The micromirrors 71 are arranged in a flat plane as shown in FIG. 6B.

The response speed of the micromirror 71 can exceed the persistent rate of the human eyes times the number of depths unless the depth resolution requirement is extremely high. It is possible to make the focal length change within hundreds of micro-seconds. The range of numerical aperture change of the MMAL is large since the range of focal length variation of the MMAL is large. So, the MMAL can have a greater range of image depths, which is an essential requirement for a three-dimensional imaging system.

What is claimed is:

1. A three-dimensional imaging system for robot vision comprising:
    (a) a lens system, comprising a variable focal length micromirror array lens (MMAL), configured to change the focal plane by changing the focal length of the variable focal length MMAL;
    (b) an imaging unit, optically coupled to the lens system, configured to receive an object image from the lens system and to sense the object image; and
    (c) an image processing unit, communicatively coupled to the imaging unit, configured to process the object images sensed by the imaging unit and to generate an all-in-focus image and three-dimensional position information of the object.

2. The three-dimensional imaging system for robot vision of claim 1, wherein the imaging unit comprises at least one two-dimensional image sensor taking the two-dimensional images at different focal planes, wherein the focal plane is changed by change of focal length of the variable focal length MMAL.

3. The three-dimensional imaging system for robot vision of claim 1, wherein the lens system further comprises an auxiliary lens or group of lenses to change the field of view of the lens system.

4. The three-dimensional imaging system for robot vision of claim 1, wherein the lens system further comprises one or more auxiliary lenses to increase the numerical aperture of the lens system.

5. The three-dimensional imaging system for robot vision of claim 1, wherein the lens system further comprises an auxiliary lens or group of lenses to change the image resolution of the three-dimensional imaging system.

6. The three-dimensional imaging system for robot vision of claim 1, wherein the lens system with the variable focal length MMAL further comprises another variable focal length MMAL for a variable field of view.

7. The three-dimensional imaging system for robot vision of claim 1, wherein the variable focal length MMAL comprises a plurality of micromirrors.

8. The three-dimensional imaging system for robot vision of claim 7, wherein each micromirror is controlled to change the focal length of the variable focal length MMAL.

9. The three-dimensional imaging system for robot vision of claim 7, wherein each micromirror is controlled to change the optical axis of the lens system.

10. The three-dimensional imaging system for robot vision of claim 1, wherein the imaging system can perform the automatic focusing function.

11. The three-dimensional imaging system for robot vision of claim 1, wherein the variable focal length MMAL compensates the aberration of the system.

12. The three-dimensional imaging system for robot vision of claim 1, further comprising an object identification unit using all-in-focus images received from the image processing unit.

13. The three-dimensional imaging system for robot vision of claim 12, wherein the object identification unit uses three-dimensional position information of the object received from the image processing unit.

14. The three-dimensional imaging device for robot vision of claim 1, wherein the imaging processes to obtain an all-in-focus image and three-dimensional position information of the object is achieved faster than the persistent rate of the human eye.

15. The three-dimensional imaging system for robot vision of claim 1, further comprising an optical tracking unit, coupled to the lens system, configured to change the optical axis of the lens system by changing the optical axis of the variable focal length MMAL to track an object of interest.

16. The three-dimensional imaging system for robot vision of claim 15, wherein the optical tracking unit is coupled to the lens system, configured to change the field of view of the lens system by changing the focal length of the variable focal length MMALs.

17. The three-dimensional imaging system for robot vision of claim 15, wherein the optical tracking unit includes a time sharing algorithm to use a wide field of view for searching and a narrow field of view for identifying and tracking the object of interest.

18. The three-dimensional imaging system for robot vision of claim 15, wherein the optical tracking unit is coupled to the lens system, configured to measure the distance to the object of interest.

19. The three-dimensional imaging system for robot vision of claim 15, wherein the optical tracking unit is coupled to the lens system, configured to measure the size of the object of interest.

\* \* \* \* \*